US010028092B2

(12) United States Patent
Bordash et al.

(10) Patent No.: US 10,028,092 B2
(45) Date of Patent: Jul. 17, 2018

(54) REDUCING CLIENT-SIDE CHATTER FOR BEACON-LEVEL EVENTS

(71) Applicant: International Business Machines Corporation, Armonk, NY (US)

(72) Inventors: Michael J. Bordash, Newtown, CT (US); Lisa Seacat DeLuca, Baltimore, MD (US); Todd E. Kaplinger, Raleigh, NC (US); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,895

(22) Filed: Dec. 14, 2015

(65) Prior Publication Data

US 2017/0171705 A1    Jun. 15, 2017

(51) Int. Cl.
H04W 4/02       (2018.01)
H04W 72/04      (2009.01)
H04W 4/021      (2018.01)

(52) U.S. Cl.
CPC .......... *H04W 4/021* (2013.01); *H04W 4/025* (2013.01); *H04W 72/046* (2013.01); *H04W 72/048* (2013.01)

(58) Field of Classification Search
CPC ... H04W 4/021; H04W 72/048; H04W 4/025; H04W 72/046
See application file for complete search history.

(56) References Cited

U.S. PATENT DOCUMENTS

| 6,564,055 B1* | 5/2003 | Hronek ................. H04W 48/18 455/418 |
| 2012/0185458 A1 | 7/2012 | Liu et al. |
| 2015/0005011 A1 | 1/2015 | Nehrenz et al. |
| 2016/0094598 A1* | 3/2016 | Gedikian .............. H04W 4/021 455/456.3 |

OTHER PUBLICATIONS

Patrick Stuedi et al., "WhereStore: Location-based Data Storage for Mobile Devices Interacting with the Cloud," Proceeding MCS '10 Proceedings of the 1st ACM Workshop on Mobile Cloud Computing and Services: Social Networks and Beyond, ACM, Jun. 15, 2010, 8 pgs.

* cited by examiner

*Primary Examiner* — Joseph Dean, Jr.
(74) *Attorney, Agent, or Firm* — Shumaker & Sieffert, P.A.

(57) ABSTRACT

A computing device may receive a plurality of beacon data from one or more beacons located within a geographic region, generate a plurality of beacon events based at least in part on the plurality of beacon data, accumulate the plurality of beacon events without sending the plurality of beacon events from the computing device to a remote computing device, and, in response to the occurrence of a trigger event, send the plurality of beacon events accumulated by the computing device to the remote computing device.

17 Claims, 4 Drawing Sheets

US 10,028,092 B2

REDUCING CLIENT-SIDE CHATTER FOR BEACON-LEVEL EVENTS

BACKGROUND

Beacons are a technology that enables awareness for mobile computing devices. Beacons may broadcast beacon data that establishes regions within a geographic region. Mobile computing devices may, based on the broadcasted beacon data, determine when it has entered or left a region in the geographic region, as well as its approximate proximity to a beacon. Mobile computing devices that receive beacon data may generate beacon events based upon the received beacon data, and may call an application programming interface (API) to send the generated beacon events to a remote computing device for processing.

For example, a department store may place beacons around its retail store. As a shopper walks around the store, the shopper's smartphone may receive beacon data, generate corresponding beacon events, and send the beacon events to a remote computing device. The remote computing device may determine that the beacon events indicate, for example, the department within the store that the shopper is located, and may direct an app running on the smartphone to display a coupon that is related to the department where the shopper is located.

SUMMARY

In general, aspects of the disclosure are directed to reducing client-side chatter for beacon-level events while maintaining real-time event processing. As the user of a mobile computing devices moves within a region that is populated by beacons, the mobile computing device may receive beacon data transmitted from numerous beacons. As beacons may continuously transmit beacon data as frequently as one every one-tenths of a second, the mobile computing device may quickly drain its battery if it sends to the remote computing device beacon events in real time as they are generated.

Thus, instead of sending beacon events in real time to a remote computing device for processing, the mobile computing device may generate and accumulate beacon events until the occurrence of a trigger event. Upon the occurrence of the trigger event, the mobile computing device may send the accumulated beacon events as a batch of beacon events. In this way, the mobile computing device may provide real-time event handling for beacon data while reducing the number of API calls back to the remote computing device and while being able to nonetheless keep track of the movements of the user of the mobile computing device In one aspect, the disclosure is directed to a method. The method may include receiving, by a computing device, a plurality of beacon data from one or more beacons located within a geographic region. The method may further include generating, by the computing device, a plurality of beacon events based at least in part on the plurality of beacon data. The method may further include accumulating, by the computing device, the plurality of beacon events without sending the plurality of beacon events from the computing device to a remote computing device. The method may further include in response to the occurrence of a trigger event, sending, by the computing device, the plurality of beacon events accumulated by the computing device to the remote computing device.

In another aspect, the disclosure is directed to a computer program product comprising a computer readable storage medium having program instructions embodied therewith, the program instructions executable by a computing device to cause the computing device to: receive a plurality of beacon data from one or more beacons located within a geographic region; generate a plurality of beacon events based at least in part on the plurality of beacon data; accumulate the plurality of beacon events without sending the plurality of beacon events from the computing device to a remote computing device; and in response to the occurrence of a trigger event, send the plurality of beacon events accumulated by the computing device to the remote computing device.

In another aspect, the disclosure is directed to a computing device. The computing device includes a memory. The computing device further includes at least one processor configured to: receive a plurality of beacon data from one or more beacons located within a geographic region; generate a plurality of beacon events based at least in part on the plurality of beacon data; accumulate the plurality of beacon events in the memory without sending the plurality of beacon events from the computing device to a remote computing device; and in response to the occurrence of a trigger event, send the plurality of beacon events accumulated by the computing device to the remote computing device.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
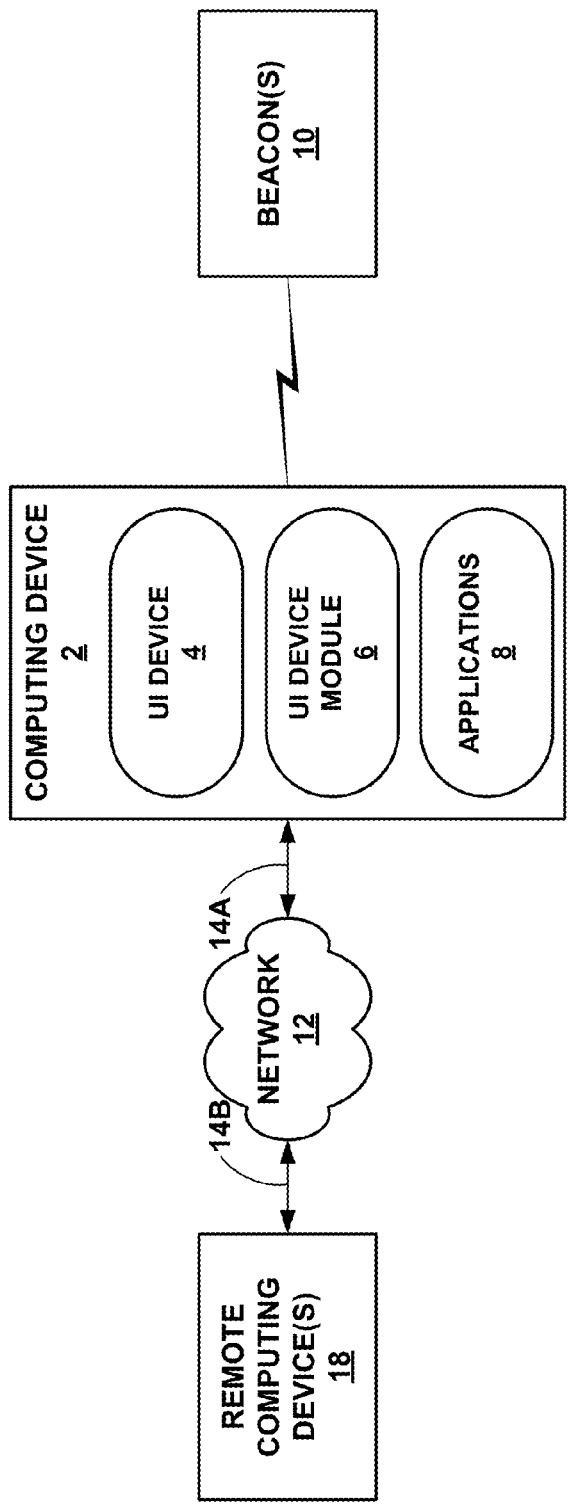
FIG. 1 is a block diagram illustrating an example system in which a computing device communicates with beacons and with one or more remote computing devices.

FIG. 1 is a block diagram illustrating an example system in which a computing device communicates with beacons and with one or more remote computing devices. As shown in FIG. 1, beacons 10 may be hardware transmitters that broadcast data according to a standardized beacon protocol, such as iBeacon. For example, beacons 10 may be hardware devices that periodically broadcast data wirelessly via any suitable technique for short-range wireless transmission of data, such as via Bluetooth Low Energy (LE), Bluetooth, Wi-Fi, and the like. The data broadcast by one or more of beacons 10 may be received by computing devices, such as computing device 2, that are within broadcasting range of the one or more of beacons 10. Typically, beacons 10 may have a broadcast range of about 70 meters.

Beacons 10 may regularly broadcast beacon data that includes identification data for each of the respective one or more beacons 10. Such identification data may include one or more of a universally unique identifier (UUID), a major value, and a minor value The UUID may uniquely identify a group of beacons as being of a certain type or being from a particular organization, such as a particular company or retailer that owns the beacon. Thus, in an example, a retailer may be associated with a particular UUID, and every beacon placed in its retail store locations in disparate geographic locations (e.g., retail stores in New York, Los Angeles, and London) may each have the same UUID associated with the retailer.

The major value may further specify a subset of the beacons having the same UUID. In the example of a UUID associated with a retailer, each retail location of the retailer may be associated with a different major value, and all of the beacons within the same retail location may share the same major value. The minor value may further specify a subset of the beacons having the same major value. In the example of a UUID associated with a retailer and a major value associated with a particular retail location, a minor value may specify a particular department, such as the men's apparel department of the retail location.

It should be understood that a UUID, a major value, and a minor value are just some of the examples of identification data that beacons 10 may broadcast. In other examples, beacons 10 may broadcast identification data to identify each of beacons 10 that includes fewer than all of a UUID, a major value, and a minor value, or may broadcast identification data that does not include any of a UUID, a major value, and a minor value. For example, a beacon may broadcast a UUID without one or more of a major value and a minor value. Further, in some examples, beacon data may include data other than identification data. For example, beacon data may also include location data for the broadcasting beacon, such as the longitude and latitude or other suitable position coordinates of where the beacon is located.

Beacons 10 may regularly beacon data. For example, each of beacons 10 may broadcast beacon data every tenths of a second, every second, every three seconds, every five seconds, and the like. The more frequently a beacon broadcasts data, the shorter the potential battery life of the beacon. Beacons 10 may be placed throughout a particular geographic region. As a computing device, such as computing device 2, moves within the broadcasting range of one or more of beacons 10, computing device 2 may receive beacon data being broadcast from those one or more beacons of beacons 10 of which computing device 2 is within broadcasting range.

Examples of computing device 2 that can receive the data broadcast by beacons 10 may include, but are not limited to, portable or mobile devices such as mobile phones (including smart phones), laptop computers, desktop computers, tablet computers, wearable computing devices such as smart watches, smart television platforms, cameras, personal digital assistants (PDAs), servers, mainframes, etc. computing device 2 may be a mobile computing device that in some examples may include user interface (UI) device 4, UI interface device module 6, and applications 8. Other examples of computing device 2 that implement techniques of this disclosure may include additional components not shown in FIG. 1.

In some examples, UI device 4 may be configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that may display a graphical user interface and receive input using capacitive, inductive, and/or optical detection at or near the presence-sensitive display.

UI device module 6 may perform one or more functions to receive input, such as user input, and send such input to other components associated with computing device 2. For example, UI device module 6 may determine a gesture performed at UI device 4. UI device module 6 may also receive data from components associated with computing device 2. Using the data, UI device module 6 may cause other components associated with computing device 2, such as UI device 4, to provide output based on the data.

Computing device 2 may output a GUI for display at UI device 4. A GUI may be a user interface that includes graphical icons and other visual indicators that a user may interact with to operate computing device 2, so that computing device may output, for display at UI device 4, the graphical icons and visual indicators included in the GUI. The GUI may present textual, graphical, and/or video content for display at UI device 4. The GUI may be a user interface generated by UI device module 6 that allows a user to interact with computing device 2. GUI 16 may include graphical content. Graphical content, generally, may include text, images, a group of moving images, etc.

UI device module 6 may be implemented in various ways. For example, UI device module 6 may be implemented as a downloadable or pre-installed application or "app." In another example, UI device module 6 may be implemented as part of a hardware unit of computing device 2. In another example, UI device module 6 may be implemented as part of an operating system of computing device 2. In some instances, portions of the functionality of UI device module 6 or any other module described in this disclosure may be implemented across any combination of an application, hardware unit, and operating system.

In some examples, computing device 2 may communicate with one or more remote computing devices 18 via network 12. Network 12 represents any public or private communication network, for instance, a cellular, Wi-Fi, and/or other type of network for transmitting data between computing devices. Computing device 2 and one or more remote computing devices 18 may send and receive data across network 12 using any suitable communication techniques. For example, computing device 2 may be operatively coupled to network 12 using network link 14A. One or more remote computing devices 18 may be operatively coupled to network 12 by network link 14B. Network 12 may include network hubs, network switches, network routers, etc., that are operatively inter-coupled thereby providing for the exchange of information between computing device 2 and one or more remote computing devices 18. In some examples, network links 14A and 14B may be Ethernet, ATM or other network connections. Such connections may be wireless and/or wired connections.

One or more remote computing devices 18 may represent any suitable remote computing systems, such as one or more desktop computers, laptop computers, mainframes, servers, cloud computing systems, etc. capable of sending and receiving information across network link 14B to network 12. In some examples, one or more remote computing devices 18 may include a beacon server that receives beacon payloads from computing device 2. In some examples, one or more remote computing devices 18 may further include a location server that communicates representations of regions of a geographical location to computing device 2. In some examples, one or more remote computing devices 18 may represent a cloud computing system that sends and receives such information through network 30 to computing device 2.

Applications 8 may perform various functions or access one or more services for computing device 10. Applications 8 may include one or more beacon-aware applications that may process beacon data received by computing device 2 from one or more of beacons 10. The one or more beacon-aware applications of applications 8 may generate beacon events based at least in part on the beacon data received by computing device 2 and may communicate the beacon payload to one of one or more remote computing devices 18 for further processing via network 12. Applications 8 may, in response to generating beacon events based at least in part on the beacon data received by computing device 2, also cause UI device 4 to output text, graphics, and/or visual indicators based on the generated beacon events. Application 8 may generate such visual indicators for output by UI device 4 based on the identification data included in the beacon data, the approximate proximity of computing device 2 to one or more of the beacons that broadcast the beacon data, and the like.

As computing device 2 receives data broadcast from one or more of beacons 10, computing device 2 may measure the signal strength of the transmission signal of those one or more beacons as, for example, received signal strength indication (RSSI) values, to approximate the proximity of a particular beacon of beacons 10. The signal strength of the signal received by computing device 2 from the beacon may generally correlate with how far away the beacon is from computing device 2. However, approximating proximity based on RSSI values may be imprecise, due to factors such as physical barriers between computing device 2 and beacons 10. For example, walls between computing device 2 and a beacon, or computing device 2 being placed in a pocket, purse, backpack, and the like, may all affect signal strength readings made by computing device 2.

While computing device 2 may be more confident about an approximated proximity to a beacon when the RSSI value of the broadcast from the beacon is strong, computing device 2 may be less confident about an approximated proximity to a beacon when the RSSI value of the broadcast from the beacon is weak. Thus, the approximated proximity may generally fall into general categories of immediate, near, far, and unknown. An immediate proximity may indicate a high level of confidence that computing device 2 is physically very close to the beacon. A near proximity may indicate that computing device 2 is about 1 to 3 meters from the beacon. A far proximity may indicate that while computing device 2 can detect a signal from the beacon, the confidence in the accuracy of the approximated proximity is too low to determine immediate or near proximity. An unknown proximity may indicate that the proximity of the beacon cannot be determined. For example, computing device 2 may receive a signal from the beacon that is too weak for computing device 2 to accurately determining an approximate proximity of the beacon.

As computing device 2 receives data transmitted from one or more of beacons 10, computing device 2 may generate beacon events that encapsulate information regarding the one or more beacons. For example, the beacon events may include an indication of the identity of the one or more beacons, such as the UUID, the major value, and the minor value. The beacon even may further include indications of the signal strength and approximate proximity of the one or more beacons. In some examples, computing device 2 may generate beacon events for beacons from which it is currently receiving data. In other examples, computing device 2 may generate beacon events for beacons from which it had previously received data, even if computing device 2 no longer receives data from those beacons. In additional examples, computing device 2 may generate beacon events for beacons form which it has never received data.

For a particular beacon data received by computing device 2 from a beacon of beacons 10, a beacon-aware application (e.g., one of applications 8) running on computing device 2 may generate a beacon event that includes an indication of the identifying data that identifies the beacon that transmitted the beacon data. The identifying data may include one or more of an UUID, a major value, and a minor value for the beacon, as well as any additional identifying data. The beacon event generated by the beacon-aware application may also include an indication of the signal strength of the broadcast signal of the beacon that transmitted the beacon data, such as the RSSI value of the signal, as well as an indication of the approximate proximity of the beacon that transmitted the beacon data, such as an indication of whether the beacon is immediate, near, far, or unknown. The beacon event may also include additional data, such as an indication of the time at which the beacon was detected by computing device 2, as well as any other suitable data.

Computing device 2 may send the beacon events it has generated from the beacon data to a remote computing device (e.g., one of the one or more remote computing devices 18) for further processing and analysis. As discussed above, a beacon may broadcast beacon data one or more times per second. Further, at a given location, computing device 2 may be within broadcast range of multiple beacons of beacons 10. Thus, if computing device 2 generates a beacon event for each beacon data it receives, and if computing device 2 sends each beacon event as it is generated to a remote computing device for further processing, computing device 2 may, in some instances, be sending beacon events to the remote computing device multiple times per second for many consecutive seconds or minutes. Such constant and continuous transmission of data can quickly drain the battery of computing device 2.

As such, in accordance with aspects of the present disclosure, instead of sending each beacon event to the remote computing device in real time upon its generation by computing device 2, computing device 2 may instead accumulate the generated beacon events without sending the beacon events to the remote server until the occurrence of a particular trigger event. When the particular trigger event occurs, computing device 2 may send the accumulated beacon events as a batch of beacon events to the remote computing device.

The trigger event that triggers computing device 2 to send the accumulated beacon events as a batch of beacon events may be based at least in part on the physical movement of computing device 2 through the geographic region where beacons 10 are situated. Computing device 2 may divide the geographic region into zones, and the movement of computing device 2 through the zones of the geographic region, or the dwelling of computing device 2 within a zone, may trigger computing device 2 to send the accumulated beacon events as a batch of beacon events. Non-exhaustive examples of trigger events may include computing device 2 entering a zone that is defined within the geographic region where beacons 10 are situated, exiting a zone that is defined within the geographic region where beacons 10 are situated, dwelling (i.e., remaining) inside a zone for a given period of time, dwelling outside a zone for a given period of time, journeying (i.e., traveling) through two or more zones, and the like.

Figure 2:
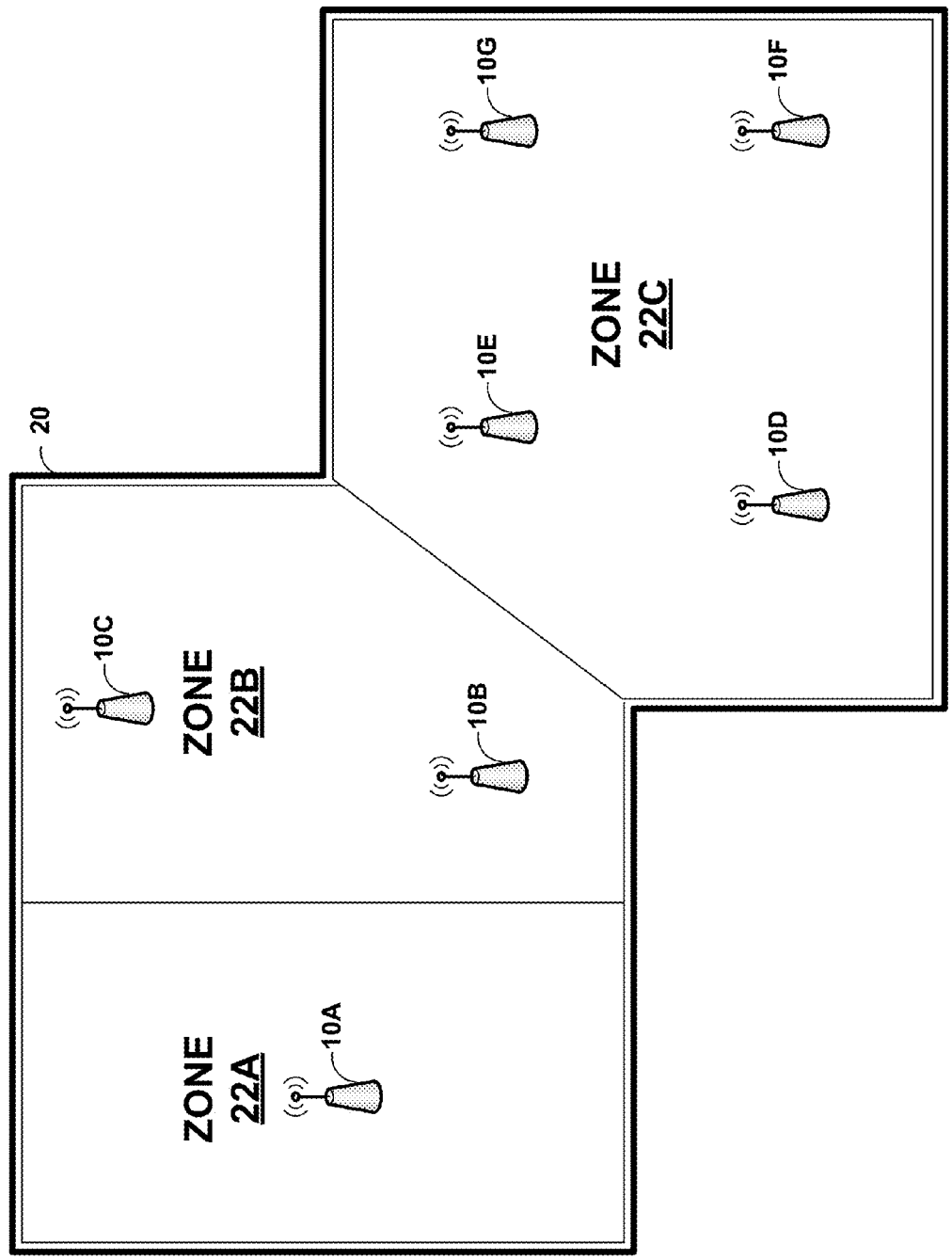
FIG. 2 is a conceptual diagram illustrating an example geographic region that may be divided into zones.

FIG. 2 is a conceptual diagram illustrating an example geographic region that may be divided into zones. As shown in FIG. 2, geographic region 20 may be a retail store that is divided up into zones 22A-22C (hereafter "zones 22"). Beacons 10A-10F may be situated throughout geographic region 20.

In one example, beacons 10 may define zones within geographic region 20. As discussed above, each of beacons 10 may broadcast an associated UUID, major value, and minor value, each of which may define a zone. For example, a particular major value may be associated with a retail location (e.g., geographic region 20), such that each of beacons 10A-10H may share the same UUID and major value. A minor value may be associated with a retail department within the retail location. Thus, the broadcast radius of one or more beacons of beacons 10A-10H that broadcast the same UUID, major value, and minor value may define a zone associated with a particular retail department.

In the example of FIG. 2, beacon 10A may broadcast a unique minor value that is different from the minor values broadcast by beacons 10B-10H. Therefore, the broadcast radius of beacon 10A may define a particular zone of geographic region 20. Beacons 10B and 10C may each broadcast the same minor value as each other, but that is different from the minor values broadcast by beacons 10A and 10D-10H. Therefore, the broadcast radius of beacons 10B and 10C may define another zone of geographic region 20. Beacons 10D-10H may each broadcast the same minor value as each other, but that is different from the minor values broadcast by beacons 10A-10C. Therefore, the broadcast radius of beacons 10D-10H may define another zone of geographic region 20.

In this example where beacons 10 define zones within geographic region 20 as the broadcast radius of one or more beacons that share the same minor value, computing device 2 may determine the particular zone in which it is located based at least in part on the signal strength of the beacons from which it can receive broadcast data as well as the approximate proximity of those beacons. For example, computing device 2 may determine that it is situated within the zone defined by the beacon with the strongest signal as measured by computing device 2.

In an alternate example, computing device 2 may arbitrarily define zones within geographic region 20. Computing device 2 may request and receive geographic data from a location server (e.g., one of the one or more remote computing devices 18) that defines zones 22 of geographic region 20. Such geographic data may be in the form of geographic JavaScript Object Location (geoJSON) objects that represents geographical features as JSON objects. For example, geoJSON objects may represent zones 22 as polygons, and computing device 2 may map the polygons specified by the geoJSON objects into zones 22 in geographic region 20. An example geoJSON object that defines a square zone may be {"type": "Polygon", "coordinates": [[[100.0, 0.0], [101.0, 0.0], [101.0, 1.0], [100.0, 1.0], [100.0, 0.0]]]}.

Computing device 2 may determine its location within geographic region 20, map its location to a point within the coordinate system of the geoJSON objects it has received, and may determine, based on the received geoJSON objects, the zone of zones 22 in which it is located. In one example, computing device 2 may determine its location based on the location data of beacons 10 included in the beacon data broadcast by beacons 10 as well as the approximate proximity of computing device 2 to one or more of beacons 10. As discussed above, beacons may include position coordinates of its location as part of its beacon data. If computing device 2 approximates its proximity to a beacon of beacons 10 as being immediate or near to the beacon, computing device 2 may take the position coordinates of that beacon as its own location. In other examples, computing device 2 may determine its location based on cell phone triangulation, global positioning system (GPS) data, and the like. In this way, computing device 2 may determine its location and movement within geographic region 20, and may be able to determine whether it has entered, exited, dwelled within, or journeyed through one or more of zones 22 of geographical location 20.

Computing device 2 may generate beacon events based at least in part on beacon data received from one or more of beacons 10A-10H, and may accumulate the generated beacon events without sending the beacon events to a remote server until the occurrence of a particular trigger event. In response to computing device 2 determining that a particular trigger event has occurred, computing device 2 may send the accumulated beacon events as a batch of beacon events to the remote computing device.

The trigger event that triggers computing device 2 to send the accumulated beacon events as a batch of beacon events may be based at least in part on the physical movement of computing device 2 through zones 20A-20C of geographic region 20. In one example, the trigger event may include computing device 2 entering a zone that is defined within the geographic region 22. For example, computing device 2 may determine that it has entered zone 20A and may, in response, send the accumulated beacon events as a batch of beacon events to a remote computing device.

In another example, the trigger event may include computing device 2 exiting a zone that is defined within the geographic region 22. For example, computing device 2 may determine that it has exited zone 20A and may, in response, send the accumulated beacon events as a batch of beacon events to a remote computing device.

In another example, the trigger event may include computing device 2 dwelling (i.e., remaining) in a zone that is defined within the geographic region 22 for a specified amount of time. For example, computing device 2 may determine that it has dwelled in zone 22A for 30 seconds and may, in response, send the accumulated beacon events as a batch of beacon events to a remote computing device.

In another example, the trigger event may include computing device 2 journeying (i.e., traveling) through zones that are defined within the geographic region 22. Computing device 2 may be considered to have journeyed through zones if it has exited a first zone, traveled through a second zone, and entered a third zone. For example, computing device 2 may determine that it has exited zone 20A, entered zone 20B, exited zone 20B, and entered 20C and may, in response to entering zone 20C, send the accumulated beacon events as a batch of beacon events to a remote computing device.

In some examples, the trigger event may include computing device 2 entering or exiting particular (but not all) zones of zones 22. For example, computing device 2 may define a trigger event if it enters zone 22A and zone 22C, but not zone 22B. In this case, if computing device 2 is located in zone 22A, computing device 2 may exit zone 22A and enter 22B without determining that the triggering event has occurred. If computing device 2 subsequently enters zone 22A from zone 22B, then computing device 2 may, in response, send the accumulated beacon events as a batch of beacon events to a remote computing device.

Computing device 2 may only accumulate beacon events that it has generated since the last occurrence of a trigger event. Thus, when computing device 2 sends the accumulated beacon events to the remote computing device, computing device 2 is sending the beacon events that have accumulated since the previous occurrence of the trigger event. Once computing event has sent the accumulated beacon events as a batch of beacon events to a remote computing device in response to the occurrence of a trigger event, computing device 2 may clear or otherwise delete the accumulated beacon events, and may start generating and accumulating a new set of beacon events.

Figure 3:
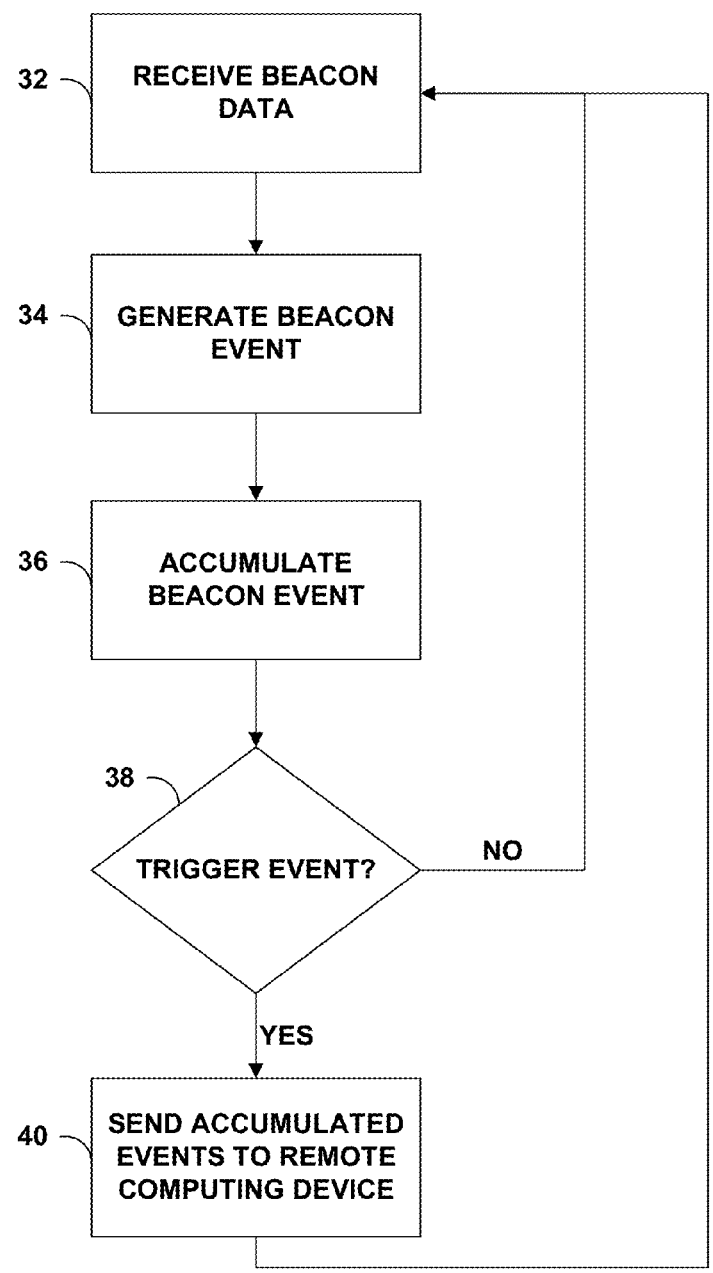
FIG. 3 is a flow chart illustrating an example process for reducing client-side chatter for beacon events in accordance to the techniques of the disclosure.

FIG. 3 is a flow chart illustrating an example process for reducing client-side chatter for beacon events in accordance to the techniques of the disclosure. FIG. 3 illustrates the techniques disclosed herein with respect to FIGS. 1 and 2. As shown in FIG. 3, computing device 2 may receive a plurality of beacon data from one or more beacons of beacons 10 located within a geographic region (32). If computing device 2 is within broadcasting range of one or more beacons, computing device 2 may receive beacon data broadcast by each of the one or more beacons. The one or more beacons may regularly broadcast beacon data, such as by broadcasting beacon data every tenths of a second, every second, and the like. The beacon data includes identification data that identifies the one or more beacons and position information of the one or more beacons within the geographic region. For example, the beacon data may include identification data identifying the respective beacon, such as a UUID, a major value, and a minor value. The beacon data may also include position data of the respective beacon, such as the latitude and longitude or other position data.

Computing device 2 may generate a plurality of beacon events based at least in part on the plurality of beacon data received from the one or more beacons (34). For each beacon event it receives, computing device 2 may generate a corresponding beacon event that includes indications of the identification data included in the corresponding beacon data, as well as additional data such as the time the particular broadcasting beacon was detected and the like. In some examples, computing device 2 may generate a beacon event as a JSON object.

Computing device 2 may accumulate the plurality of beacon events without sending the plurality of beacon events from computing device 2 to a remote computing device (e.g., to a remote computing device of one or more remote computing devices 18) (36). Computing device 2 may store the plurality of beacon events on a computer-readable storage device, such as memory, a hard drive, flash memory, and the like.

Computing device 2 may determine whether a trigger event has occurred (38). The trigger event may be based at least in part on a positional movement of computing device 2 within a geographic location and, more specifically, based at least in part on geographical movement of the computing device within the geographic region. Computing device 2 may define a plurality of zones within the geographic region (e.g., zones 22 within geographic region 20). Computing device 2 may receive location information from a remote computing device that defines the plurality of zones within the geographic region. For example, such location information may be in the form of geoJSON objects. Computing device 2 may also determine the position of computing device 2 within the geographic region based at least in part on the position information of one or more beacons within the geographic region.

The trigger event may include computing device 2 entering a zone of the plurality of zones. The trigger event may further include computing device 2 exiting a zone of the plurality of zones. The trigger event may further include computing device 2 dwelling within a zone of the plurality of zones for a specified period of time.

If computing device 2 determines that a trigger event has not occurred, computing device 2 may continue to receive beacon data from one or more beacons (32), generate beacon events (34), and accumulate beacon events (36) until the occurrence of a trigger event. If computing device 2 determines that a trigger event has occurred, computing device 2 may, in response to the occurrence of a trigger event, send the plurality of beacon events accumulated by computing device 2 as a batch to a remote computing device for further processing (40). The remote computing device may save the beacon events as a historical reference of user behavior and movement and for better fine-grained determination of user behavior within zones of a geographic region. Computing device 2 may only send to the remote computing device the beacon events it has generated and accumulated since the occurrence of the last occurrence of the trigger event. Thus, computing device 2 may also clear from memory the plurality of beacon events it has accumulated once it has sent those beacon events to the remote computing device.

Figure 4:
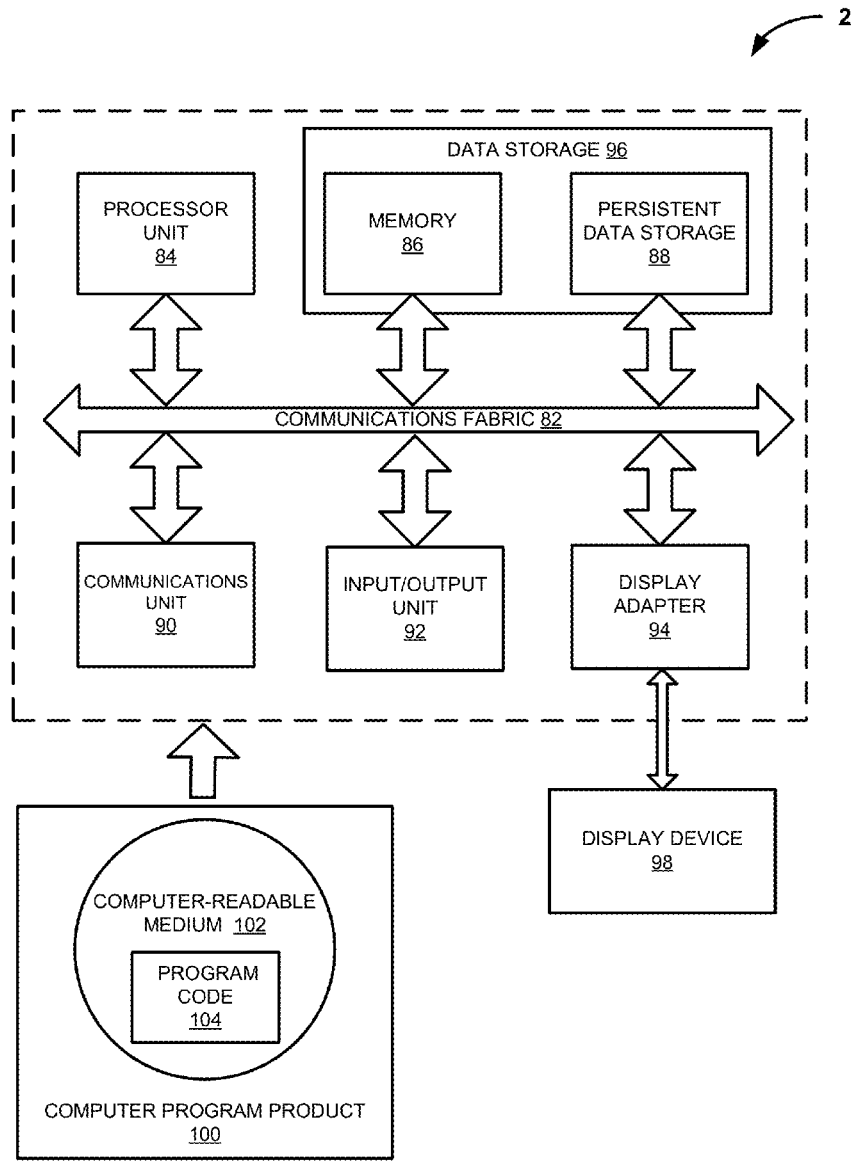
FIG. 4 is a block diagram illustrating the computing device of FIG. 1 in further detail, according to an illustrative example.

FIG. 4 is a block diagram of computing device 2 in further detail, according to an illustrative example. In the illustrative example of FIG. 4, computing device 2 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 2.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms.

While memory 86 is depicted physically separated from processor unit 84 and other elements of computing device 2, memory 86 may refer equivalently to any intermediate or cache memory at any location throughout computing device 2, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code, such as applications 8. This program code may be stored on memory 86, persistent data storage 88, or elsewhere in computing device 2. This program code may also take the form of program code 104 stored on computer-readable medium 102 comprised in computer program product 100, and may be transferred or communicated, through any of a variety of local or remote means, from computer program product 100 to computing device 2 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 2, such as printers, bus adapters, and other computers. Communications unit 90 may be implemented as an expansion card or be built into a motherboard, for example.

The input/output unit 92 can support devices suited for input and output of data with other devices that may be connected to computing device 2, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 2 as appropriate.

Computing device 2 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 2 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 2, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 2 to physically assume new capabilities that it did not have until its physical state was changed by loading the executable instructions comprised in program code 104.

In some illustrative examples, program code 104 may be downloaded over a network to data storage 96 from another device or computer system for use within computing device 2. Program code 104 comprising computer-executable instructions may be communicated or transferred to computing device 2 from computer-readable medium 102 through a hard-line or wireless communications link to communications unit 90 and/or through a connection to input/output unit 92. Computer-readable medium 102 comprising program code 104 may be located at a separate or remote location from computing device 2, and may be located anywhere, including at any remote geographical location anywhere in the world, and may relay program code 104 to computing device 2 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   receiving, by a computing device located within a geographic region, a plurality of beacon data transmitted directly to the computing device from a plurality of beacons located within the geographic region without sending data to the plurality of beacons to trigger transmission of the plurality of beacon data;
   generating, by the computing device, a plurality of beacon events that indicates information associated with at least the plurality of beacons from which the computing device receives the plurality of beacon data based at least in part on the plurality of beacon data;
   accumulating, by the computing device, the plurality of beacon events without sending the plurality of beacon events from the computing device to a remote computing device;
   determining, by the computing device, an occurrence of a trigger event in response to geographical movement of the computing device through one or more of a plurality of zones that are defined within the geographic region; and
   in response to the occurrence of the trigger event, sending, by the computing device, the plurality of beacon events accumulated by the computing device to the remote computing device.

2. The method of claim 1, further comprising:
   defining, by the computing device, the plurality of zones within the geographic region.

3. The method of claim 1, wherein the trigger event comprises:
   the computing device entering a zone of the plurality of zones.

4. The method of claim 1, wherein the trigger event comprises:
   the computing device exiting a zone of the plurality of zones.

5. The method of claim 1, wherein the trigger event comprises:
   the computing device dwelling within a zone of the plurality of zones for a specified period of time.

6. The method of claim 1, wherein defining the plurality of zones within the geographic region further comprises:
   receiving, by the computing device, location information that defines the plurality of zones within the geographic region.

7. The method of claim 1, wherein the plurality of beacon data includes identification data that identifies the one or more beacons and position information of the one or more beacons within the geographic region.

8. The method of claim 7, further comprising:
   determining, by the computing device, a position of the computing device within the geographic region based at least in part on one or more of the position information of the one or more beacons within the geographic region.

9. A computer program product comprising a computer readable storage medium having program instructions embodied therewith, the program instructions executable by a computing device to cause the computing device to:
   receive a plurality of beacon data transmitted directly to the computing device located within a geographic region from a plurality of beacons located within geographic region without sending data to the plurality of beacons to trigger transmission of the plurality of beacon data;
   generate a plurality of beacon events that indicates information associated with at least the plurality of beacons from which the computing device receives the plurality of beacon data based at least in part on the plurality of beacon data;
   accumulate the plurality of beacon events without sending the plurality of beacon events from the computing device to a remote computing device;
   determine an occurrence of a trigger event in response to geographical movement of the computing device through one or more of a plurality of zones that are defined within the geographic region; and
   in response to the occurrence of the trigger event, send the plurality of beacon events accumulated by the computing device to the remote computing device.

10. The computer program product of claim 9, wherein the program instructions are further executable by the computing device to cause the computing device to:
    define the plurality of zones within the geographic region.

11. The computer program product of claim 9, wherein the trigger event comprises:
    the computing device entering a zone of the plurality of zones.

12. The computer program product of claim 9, wherein the trigger event comprises:
the computing device exiting a zone of the plurality of zones.

13. The computer program product of claim 9, wherein the trigger event comprises:
the computing device dwelling within a zone of the plurality of zones for a specified period of time.

14. A computing device, comprising:
a memory:
at least one processor configured to:
receive a plurality of beacon data transmitted directly to the computing device located within a geographic region from a plurality of beacons located within the geographic region without sending data to the plurality of beacons to trigger transmission of the plurality of beacon data;
generate a plurality of beacon events that indicates information associated with at least the plurality of beacons from which the computing device receives the plurality of beacon data based at least in part on the plurality of beacon data;
accumulate the plurality of beacon events in the memory without sending the plurality of beacon events from the computing device to a remote computing device;
determine an occurrence of a trigger event in response to geographical movement of the computing device through one or more of a plurality of zones that are defined within the geographic region; and
in response to the occurrence of the trigger event, send the plurality of beacon events accumulated by the computing device to the remote computing device.

15. The computing device of claim 14, wherein the program instructions are further executable by the computing device to cause the computing device to:
define the plurality of zones within the geographic region.

16. The computing device of claim 14, wherein the trigger event comprises:
the computing device entering a zone of the plurality of zones.

17. The computing device of claim 14, wherein the trigger event comprises:
the computing device exiting a zone of the plurality of zones.

* * * * *